(12) United States Patent
Lee et al.

(10) Patent No.: US 11,181,414 B2
(45) Date of Patent: Nov. 23, 2021

(54) APPARATUS FOR MEASURING RESIDUAL AMOUNT OF FUEL IN FUEL TANK USING ULTRASONIC SENSOR

(71) Applicant: COAVIS, Sejong-si (KR)

(72) Inventors: Tae Hoon Lee, Sejong-si (KR); Ji Ho Jung, Sejong-si (KR); Hyun Tae Lee, Sejong-si (KR)

(73) Assignee: COAVIS, Sejong-si (KR)

( * ) Notice: Subject to any disclaimer, the term of this patent is extended or adjusted under 35 U.S.C. 154(b) by 513 days.

(21) Appl. No.: 16/237,313

(22) Filed: Dec. 31, 2018

(65) Prior Publication Data

US 2019/0204135 A1 Jul. 4, 2019

(30) Foreign Application Priority Data

Jan. 2, 2018 (KR) .......................... 10-2018-0000024

(51) Int. Cl.
*G01F 23/296* (2006.01)
*B60K 15/03* (2006.01)

(52) U.S. Cl.
CPC .................. *G01F 23/2962* (2013.01); *B60K 2015/03217* (2013.01)

(58) Field of Classification Search
CPC .......... B60K 15/03; B60K 2015/03217; G01F 23/2962
See application file for complete search history.

(56) References Cited

U.S. PATENT DOCUMENTS

| | | | | |
|---|---|---|---|---|
| 4,790,185 A | * | 12/1988 | Fedelem | G01F 23/30 137/565.24 |
| 5,666,851 A | * | 9/1997 | Bacon | G01F 23/36 338/33 |
| 6,990,862 B2 | * | 1/2006 | Bergsma | G01F 23/363 73/305 |
| 2006/0201578 A1 | * | 9/2006 | Schillinger | G01F 23/2962 141/94 |
| 2017/0122789 A1 | * | 5/2017 | Borsoi | G01N 29/024 |

FOREIGN PATENT DOCUMENTS

KR 101323399 B1 10/2013
KR 101709056 B1 3/2017

OTHER PUBLICATIONS

Ashraf A. A. Beshr, "Structural Data Analysis for Monitoring the Deformation of Oil Storage Tanks Using Geodetic Techniques", Journal of Surveying Engineering • Feb. 2014 (Year: 2014).*

* cited by examiner

*Primary Examiner* — Regis J Betsch
(74) *Attorney, Agent, or Firm* — McCoy Russell LLP

(57) ABSTRACT

Provided is an apparatus for measuring a residual amount of fuel in a fuel tank using an ultrasonic sensor that may simplify wirings, may simplify an assembly method, and may respond to contraction or expansion of the tank according to a change in temperature as compared to the conventional apparatus for measuring a residual amount of fuel in a fuel tank using an ultrasonic sensor.

6 Claims, 5 Drawing Sheets

APPARATUS FOR MEASURING RESIDUAL AMOUNT OF FUEL IN FUEL TANK USING ULTRASONIC SENSOR

CROSS-REFERENCE TO RELATED APPLICATIONS

This application claims priority under 35 U.S.C. § 119 to Korean Patent Application No. 10-2018-0000024, filed on Jan. 2, 2018, in the Korean Intellectual Property Office, the disclosure of which is incorporated herein by reference in its entirety.

TECHNICAL FIELD

The following disclosure relates to an apparatus for measuring a residual amount of fuel in a fuel tank using an ultrasonic sensor, and more particularly, to an apparatus for measuring a residual amount of fuel in a fuel tank using an ultrasonic sensor that may simplify wirings as compared to the conventional apparatus for measuring a residual amount of fuel in a fuel tank using an ultrasonic sensor, may simplify an assembly method, and may respond to contraction or expansion of the tank according to a change in temperature.

BACKGROUND

An apparatus for measuring a residual amount of fuel is installed in a fuel tank included in a vehicle to inform a driver of the residual amount of fuel. The conventional apparatus installed in a fuel tank to measure a residual amount of fuel, that is, a level of fuel stored in the fuel tank is filed by the present applicant and is registered (Korean Patent No. 10-1709056 published on Mar. 8, 2017 entitled "A System and Method for Measuring Liquid Level of Vehicle Fuel Tank", which is referred to as the related art 1).

FIG. 1 illustrates one of the drawings of the related art 1. The conventional method for measuring a residual amount of fuel in fuel tank as in the related art 1 will be described with reference to FIG. 1. As illustrated in FIG. 1, as in the related art 1, an ultrasonic sensor 10 is conventionally installed so as to be immersed in the fuel tank, that is, fuel. The ultrasonic sensor 10 includes a reference sensor 11 that emits an ultrasonic wave toward a wall surface installed in the fuel tank and measures the time when the ultrasonic wave reflected and returned from the wall surface is received, and a measurement sensor 12 that emits an ultrasonic wave toward a liquid level of fuel and measures the time when the ultrasonic wave reflected from the liquid level is re-incident on the ultrasonic sensor and received. Since a distance from the reference sensor 11 to the wall surface is constant, speed of the ultrasonic wave may be calculated in a current environment (the speed of the ultrasonic wave varies depending on a temperature in a medium) through the time of incidence after the ultrasonic wave is emitted from the reference sensor 11, and a height of the fuel may be calculated using the speed of the ultrasonic wave calculated through the reference sensor 11 and the time measured by the measurement sensor 12, and the residual amount of the fuel may be calculated using the calculated height.

Meanwhile, a fuel pump is installed in the fuel tank. The fuel pump is generally installed from an upper side to a lower side of the fuel tank, a flange including a printed circuit board (PCB) for driving the fuel pump is installed on an upper portion of the fuel tank, and a wiring of the sensor for measuring the residual amount of the fuel in the fuel tank is performed together in the flange. In the method as in the related art 1, since the wiring of the ultrasonic sensor 10 is formed from an upper side to a lower side thereof, there is a problem that an assembly is inconvenient and the wiring becomes complicated, and there is a problem that the residual amount of the fuel to be measured is not accurate when the fuel tank, which is generally made of a synthetic resin material, expands or contracts.

In order to solve the above-mentioned problems, the technology such as Korean Patent No. 10-1323399 (published on Oct. 29, 2013 entitled "Urea Solution Level Measuring Apparatus Using Ultrasonic Wave Level Sensor", which is referred to as the related art 2) in which the ultrasonic sensor is installed at an upper side is introduced. However, the related art 2 does not consider that the tank in which a fluid is accommodated expands or contracts according to the temperature and an error occurs in a measured value of the sensor.

RELATED ART DOCUMENT

Patent Document

1. Korean Patent No. 10-1709056 entitled: "A System and Method for Measuring Liquid Level of Vehicle Fuel Tank", published on Mar. 8, 2017
2. Korean Patent No. 10-1323399 entitled: "Urea Solution Level Measuring Apparatus Using Ultrasonic Wave Level Sensor", published on Oct. 29, 2013

SUMMARY

An embodiment of the present invention is directed to providing an apparatus for measuring a residual amount of fuel in a fuel tank using an ultrasonic sensor that may be installed in the fuel tank, may simplify wirings to simplify an assembly method, and may relatively accurately measure the residual amount of fuel measured by the ultrasonic sensor even when the fuel tank expands or contracts according to a change in an environment (a change in temperature).

In one general aspect, an apparatus for measuring a residual amount of fuel in a fuel tank using an ultrasonic sensor includes: a measurement pipe installed in the fuel tank so that the fuel is introduced into an internal space of the measurement pipe; a measurement sensor installed on an inner upper surface of the fuel tank to emit ultrasonic waves toward a liquid level of fuel accommodated in the internal space of the measurement pipe and to measure the time that the ultrasonic waves are reflected from a liquid level and returned; a fixed reflection plate installed above fuel accommodated in the fuel tank and having a fixed height to a lower surface of the fuel tank; a reference sensor installed above the fuel accommodated in the fuel tank to emit the ultrasonic waves toward the fixed reflection plate and to measure the time that the ultrasonic waves are reflected from the fixed reflection plate and returned; and a calculation unit calculating the residual amount of the fuel tank using the time measured by the measurement sensor, the time measured by the reference sensor, a height of the fixed reflection plate, and an area of a cross section of the fuel tank.

The fixed reflection plate may be coupled to a member extending upwardly from the lower surface of the fuel tank, or may be coupled to the measurement pipe.

The fuel tank may be formed of a synthetic resin, and the member or the measurement pipe may be formed of a material having a thermal expansion coefficient smaller than that of the synthetic resin forming the fuel tank.

The fixed reflection plate and the measurement pipe may be located at the center of the fuel tank.

The calculation unit may calculate an interval between the reference sensor and the fixed reflection plate by using the time measured by the reference sensor, and calculate the degree of expansion or contraction of the fuel tank by comparing the interval with a reference interval between the reference sensor and the fixed reflection plate when the fuel tank does not expand or contract.

The calculation unit may calculate the residual amount of the fuel tank using the calculated degree of expansion or contraction of the fuel tank, a speed of the ultrasonic wave calculated by the time measured by the reference sensor, the height of the liquid level calculated by the time measured by the measurement sensor, and the area of the cross section of the fuel tank.

The fuel tank may be formed of a synthetic resin.

DETAILED DESCRIPTION OF MAIN ELEMENTS

Figure 1:
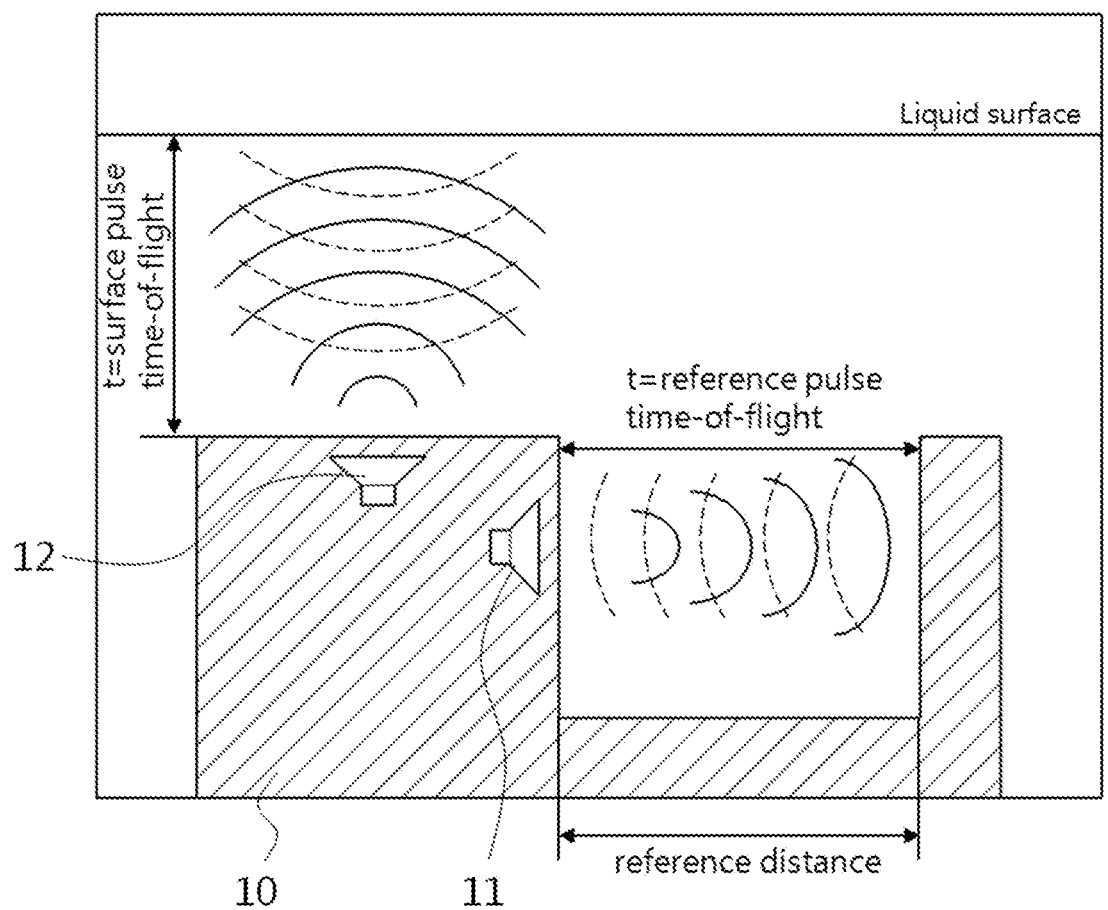
FIG. 1 is a cross-sectional view of the conventional fuel tank having an ultrasonic sensor located at a lower portion thereof.

10: ultrasonic sensor
11, 400: reference sensor
12, 200: measurement sensor
20: fuel tank
21: fuel
22: flange
23: PCB
100: measurement pipe
300: fixed reflection plate
310: supporting member

DETAILED DESCRIPTION OF EMBODIMENTS

Hereinafter, an apparatus for measuring a residual amount of fuel in a fuel tank using an ultrasonic sensor according to various embodiments of the present invention will be described in detail with reference to the accompanying drawings, and after configurations included in the respective embodiments are briefly described, an organic operation between the configurations included in the embodiments of the present invention will be described in detail.

First Embodiment

Figure 2:
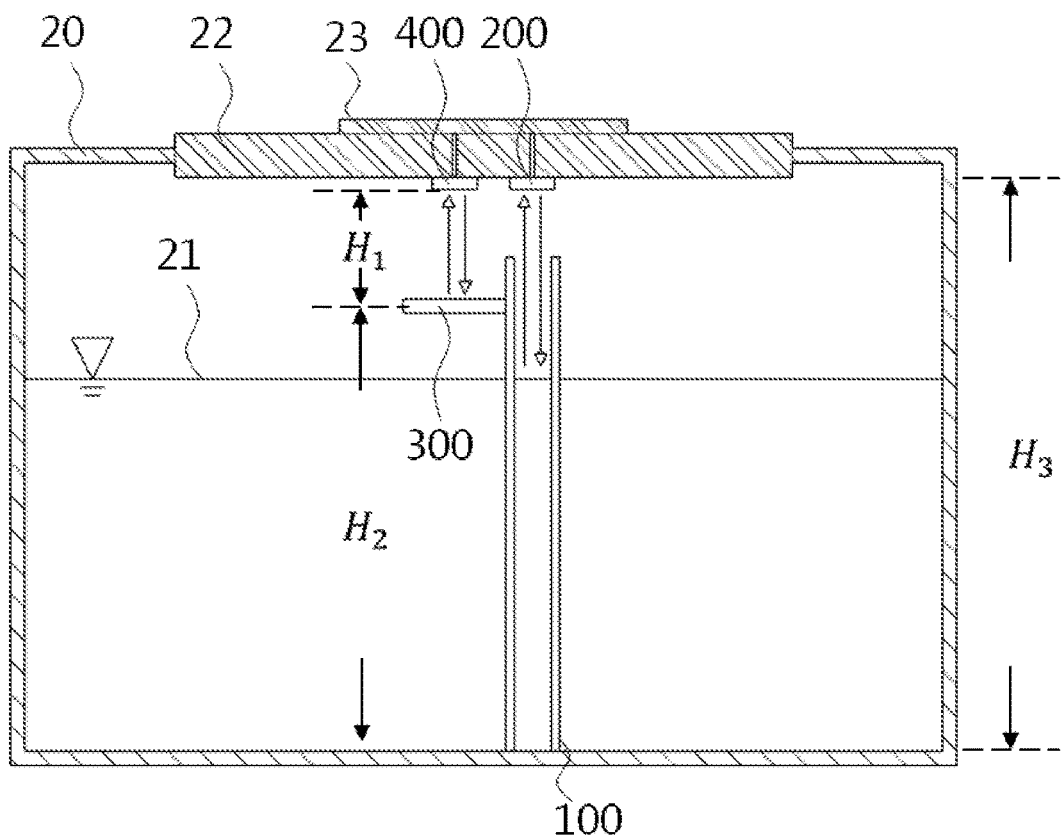
FIG. 2 is a cross-sectional view of a fuel tank in which an apparatus for measuring a residual amount of fuel according to a first embodiment of the present invention is installed.

FIG. 2 illustrates a cross section of a fuel tank in which an apparatus for measuring a residual amount of fuel according to a first embodiment of the present invention is installed. As illustrated in FIG. 2, an apparatus for measuring a residual amount of fuel in a fuel tank according to a first embodiment of the present invention may include a measurement pipe 100, a measurement sensor 200, a fixed reflection plate 300, a reference sensor 400, and a calculation unit (not illustrated) which are installed in a fuel tank 20.

A fuel pump is installed in the fuel tank 20, but since the fuel pump installed in the fuel tank in the present invention is not greatly important, the fuel pump is omitted in the drawings and the first embodiment of the present invention will be described.

The fuel tank 20 illustrated in FIG. 2 literally accommodates fuel as a kind of accommodating tank. The fuel tank 20 may be a fuel tank of various transportation means, but in the following various embodiments of the present invention, the case in which the fuel tank 20 is used in a vehicle will be described as an example.

The fuel tank 20 is generally made of a synthetic resin material in consideration of easiness of manufacturing a fuel tank and manufacturing cost of the fuel tank. In a case in which the fuel tank 20 is made of the synthetic resin material, the fuel tank 20 may expand or contract according to a change in temperature due to various factors.

The measurement pipe 100 illustrated in FIG. 2 is a kind of pipe or tube having an internal space, and may be a sound tube generally used for increasing measurement sensitivity. The measurement pipe 100 may be installed in the fuel tank 20 so that a lower portion of the measurement pipe 100 is immersed in the fuel 21 accommodated in the fuel tank 20, and at least one hole is formed in a lower end or a middle end of the measurement pipe 100 immersed in the fuel 21 to allow the fuel 21 to be introduced into the measurement pipe 100.

It is preferable that the measurement pipe 100 is formed of a material having a small thermal deformation, that is, a material having a small thermal expansion coefficient depending on a change in temperature. In particular, the measurement pipe 100 may be formed of a material having a thermal expansion coefficient smaller than that of the synthetic resin, which is the material of the fuel tank 20.

Since the measurement pipe 100 is in the shape of a pipe or tube whose upper side and lower side are opened, a pressure inside the measurement pipe 100 is equal to an internal pressure of the fuel tank 20. Therefore, a height of the fuel introduced into the measurement pipe 100 becomes equal to a height of the fuel 21 accommodated in the fuel tank 20.

As illustrated in FIG. 2, the measurement sensor 200 is installed on an inner upper surface of the fuel tank 20 at a position corresponding to the measurement pipe 100 to emit ultrasonic waves toward a liquid level of the fuel accommodated in the inner space of the measurement pipe 100, receive the ultrasonic waves reflected and returned from the liquid level of the fuel, and measure the time until the ultrasonic waves are received after the emission. An interval from the measurement sensor 200 to the liquid level of the fuel may be calculated over time if a propagation speed of the ultrasonic waves in the air may be calculated in an environment of the fuel tank 20 because a distance may be obtained by multiplying the time by the speed.

As illustrated in FIG. 2, the fixed reflection plate 300 is installed above the fuel accommodated in the fuel tank, that is, in the air of the fuel tank 20, and is connected and fixed to the measurement pipe 100 to thereby fix a height to an inner lower surface of the fuel tank 20. The fixed reflection plate 300 may be installed in parallel with a lower surface of the fuel tank 20 in a steady state (a state in which expansion or contraction does not occur).

As illustrated in FIG. 2, the reference sensor 400 is installed above the fixed reflection plate 300, that is, on an inner upper surface of the fuel tank 20 to emit ultrasonic waves toward the fixed reflection plate 300 and measure the time that the ultrasonic waves are reflected from the fixed reflection plate 300 and returned to the reference sensor 400. That is, the measurement sensor 200 and the reference sensor 400 are functionally identical.

The calculation unit calculates a residual amount of the fuel tank by using the time measured by the measurement sensor, the time measured by the reference sensor, the height of the fixed reflection plate, and an area of a cross section of the fuel tank.

Hereinafter, a process of calculating the residual amount of the fuel tank using the apparatus for measuring the residual amount of the fuel in the fuel tank according to the first embodiment of the present invention will be described in detail with reference to the accompanying drawings.

The fuel tank 20 illustrated in FIG. 2 is in a state in which thermal deformation, that is, expansion or contraction does not occur. In the state of FIG. 2, the reference sensor 400 emits the ultrasonic waves toward the fixed reflection plate 300 and measures the time $t_1$ (unit time of seconds) that the ultrasonic waves are reflected and returned. Since the propagation speed of ultrasonic waves in the air is about 340 m per second at room temperature (20° C.), $H_1$, which is an interval between the reference sensor 400 and the fixed reflection plate 300 is calculated by the following Equation.

$$H_1 = 340 \times \frac{t_1}{2}$$ [Equation 1]

Since a height $H_2$ of the fixed reflection plate 300 and a height (in more detail, a height from the lower surface of the fuel tank 20 to the measurement sensor 200) $H_3$ of the fuel tank 20 are numeric values known to a user as initial design values, an error value Err is calculated by the following Equation.

$$Err = H_3 - (H_1 + H_2)$$ [Equation 2]

The error value Err is a value indicating whether the fuel tank 20 has contracted or expanded in a vertical direction when compared with the initial design value of the fuel tank 20. When the error value Err is 0 or is within a tolerance range, the fuel tank 20 is in a state in which the fuel tank 20 does not expand or contract. When the error value Err is a negative number and deviates from the tolerance range, the fuel tank 20 is in an expanded state. When the error value Err is a positive number and deviates from the tolerance range, the fuel tank 20 is in a contracted state.

When the fuel tank 20 does not expand as illustrated in FIG. 2, the error value Err is 0 or is within the tolerance range.

After calculating the error value Err by Equation 2, the measurement sensor 200 emits the ultrasonic waves toward the liquid level of the fuel accommodated in the measurement pipe 100, measures the time $t_2$ until the emitted ultrasonic waves are reflected from the liquid level of the fuel and are incident on the measurement sensor 200, calculates $H_4$, which is a distance between the measurement sensor 200 and the liquid level of the fuel by multiplying a half of $t_2$ by the speed of the ultrasonic waves in the same manner as Equation 1, and then calculates a height $H_{level}$ of the liquid level by the following Equation.

$$H_{level} = H_3 - H_4 - Err$$ [Equation 3]

The calculation unit may calculate the residual amount of the fuel accommodated in the fuel tank 20 by multiplying the height $H_{level}$ of the liquid level by a cross section of the fuel tank 20 in a horizontal direction. However, a method of calculating the residual amount of the fuel by multiplying the height $H_{level}$ of the liquid level by the cross section of the fuel tank 20 in the horizontal direction describes a case in which the state in which the fuel tank 20 is expanded or contracted as illustrated in FIG. 2 has a rectangular parallelepiped shape. When the shape of the fuel tank 20 is changed from the rectangular parallelepiped shape due to expansion or contraction or when the shape of the fuel tank 20 originally formed is not the rectangular parallelepiped, the residual amount of fuel accommodated in the fuel tank may be calculated by integration or a variety of manners.

In the above-mentioned process, the propagation speed of the ultrasonic waves in the air may be changed depending on the temperature, but since the distance between the fixed reflection plate 300 and the reference sensor 400 is relatively as short as 1 m or less, the propagation speed of the ultrasonic waves in the calculation unit may be determined as a constant of 340 m per second and the above-mentioned process may be calculated. However, in order to more accurately perform the calculation, a separate temperature sensor is provided in the fuel tank. The calculation unit may calculate the residual amount of the fuel by using different propagation speeds of the ultrasonic waves depending on the temperature measured by the temperature sensor. In addition to this, an ultrasonic sensor is installed on the upper portion of the fuel tank to emit ultrasonic waves in the horizontal direction and a reflection plate for reflecting the ultrasonic waves emitted from the ultrasonic sensor is additionally provided. Thus, the propagation speed of the ultrasonic waves in the air in the fuel tank is calculated in real time, thereby making it possible to more accurately calculate the height of the liquid level.

Hereinafter, a process of measuring the height of the liquid level of the fuel through Equations 1 to 3 when the fuel tank 20 has expanded or contracted will be described in detail.

Figure 3:
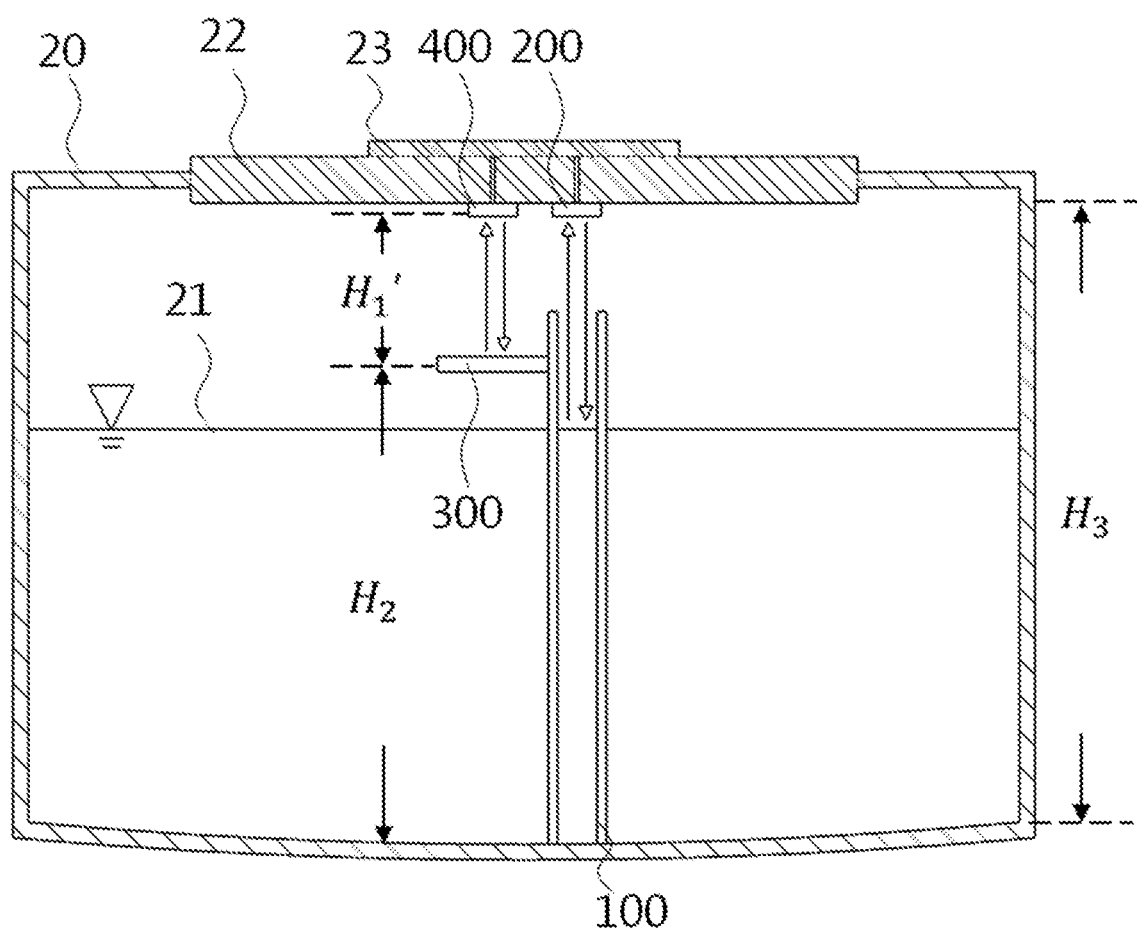
FIG. 3 is a cross-sectional view in case that the fuel tank in which the apparatus for measuring the residual amount of the fuel according to the first embodiment of the present invention is installed has expanded.

FIG. 3 illustrates a schematic cross section in the case that the fuel tank in which the apparatus for measuring the residual amount of the fuel according to the first embodiment of the present invention is installed expands. The fuel tank is generally manufactured in the form in which a width thereof in a horizontal direction is greater than a height thereof. When the fuel tank has such a form, deformation of the fuel tank in a height direction caused by thermal expansion is greater than deformation of the fuel tank in a width direction. Therefore, the deformation in the height direction will be mainly described in the present invention.

In FIG. 3, the fuel tank 20 is in a state in which a lower surface thereof expands downwardly. The reason is because the thermal deformation of the lower surface of the fuel tank 20 is relatively greater than that of the upper portion of the fuel tank 20 due to the fact that the lower surface of the fuel tank 20 is made entirely of synthetic resin material while the upper surface of the fuel tank 20 is assembled with other apparatuses such as the PCB 23 including the flange 22.

In the state of FIG. 3, the reference sensor 400 emits the ultrasonic waves toward the fixed reflection plate 300, measures the time $t_{1'}$ that the ultrasonic waves are reflected and returned, and calculates an interval $H_{1'}$ between the reference sensor 400 and the fixed reflection plate 300 in FIG. 3 by applying $t_1$, to Equation 1 instead of $t_1$. Since the height of the fixed reflection plate 300 in FIG. 3 moves downwardly as compared to FIG. 2, $H_1$, becomes larger than $H_1$ and the error value Err thus becomes a negative number.

Thereafter, the measurement sensor 200 emits the ultrasonic waves toward the liquid level of the fuel accommodated in the measurement pipe 100, measures the time $t_2$, until the emitted ultrasonic waves are reflected from the liquid level of the fuel and are incident on the measurement sensor 200, calculates $H_4$, which is a distance between the measurement sensor 200 and the liquid level of the fuel by multiplying a half of the time that the ultrasonic waves emitted from the measurement sensor 200 propagate by the speed of the ultrasonic waves in the same manner as Equation 1, and then calculates the height $H_{level}$ of the liquid level of the fuel by Equation 3. Since $H_{4'}$ is greater than $H_4$, but the error value Err, which is the negative number, compensates for a difference between $H_{4'}$ and $H_4$, the calculation unit may accurately calculate the height $H_{level}$ of the liquid level of the fuel.

Figure 4:
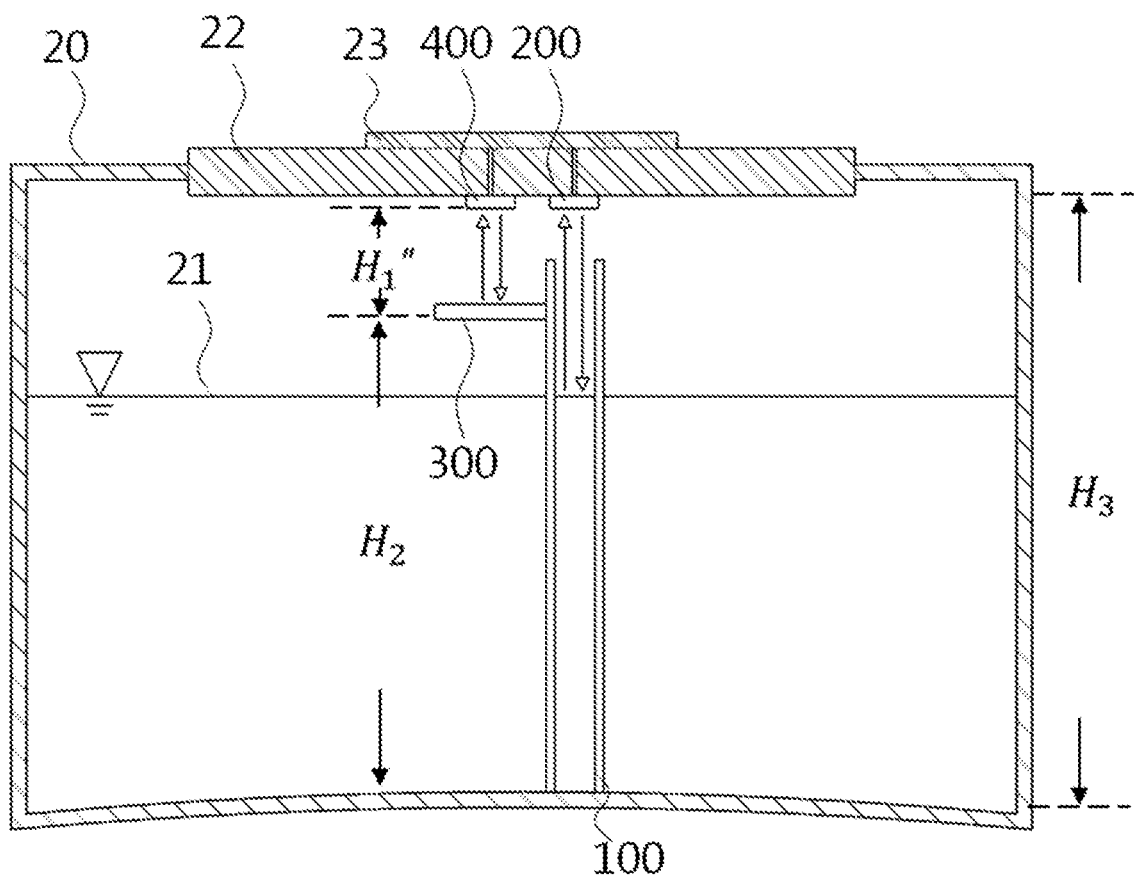
FIG. 4 is a cross-sectional view in case that the fuel tank in which the apparatus for measuring the residual amount of the fuel according to the first embodiment of the present invention is installed has contracted.

The process described above may also be applied to a case in which the fuel tank 20 illustrated in FIG. 4 has contracted.

Second Embodiment

Hereinafter, an apparatus for measuring a residual amount of fuel in a fuel tank using an ultrasonic sensor according to a second embodiment of the present invention will be described in detail with reference to the accompanying drawings.

Figure 5:
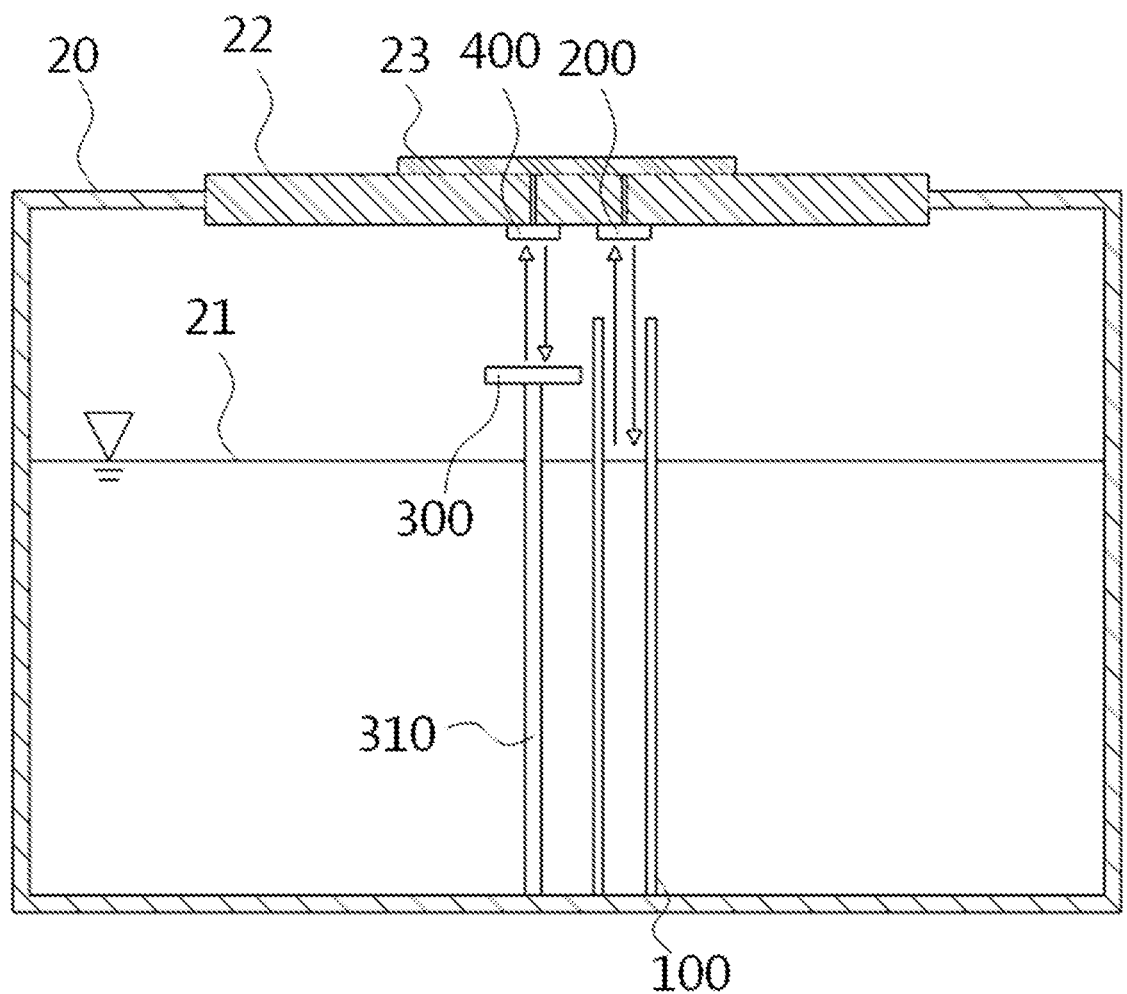
FIG. 5 is a cross-sectional view of a fuel tank in which an apparatus for measuring a residual amount of fuel according to a second embodiment of the present invention is installed.

FIG. 5 schematically illustrates a cross section of an apparatus for measuring a residual amount of fuel in a fuel tank using an ultrasonic sensor according to a second embodiment of the present invention. The first embodiment and the second embodiment of the present invention have a difference in that a configuration to which the fixed reflection plate 300 is connected and fixed is changed. Hereinafter, only the fixed reflection plate 300 in which the configuration connected and fixed thereto is changed will be described. The configurations of the second embodiment, which are not described below, are regarded as the same configurations as those of the first embodiment if they have the same reference numeral or name as those of the first embodiment.

As illustrated in FIG. 5, the fixed reflection plate 300 is connected to and supported by a separate supporting member 310 The supporting member 310, which is a member extending from the lower surface of the fuel tank 20 to the upper side thereof in the same manner as the measurement pipe 100, may be formed of various materials, but may be formed of a material having less thermal expansion, that is, a material having a small thermal expansion coefficient, and in particular, a material having a thermal expansion coefficient smaller than that of the synthetic resin.

A height of the supporting member 310 illustrated in FIG. 5, that is, a height from the lower surface of the fuel tank 20 to the fixed reflection plate 300, corresponds to $H_2$ of the first embodiment.

The reason why the supporting member 310 is installed is that when the measurement pipe 100 itself is formed of a tube material to increase sensitivity of the ultrasonic sensor (the measurement sensor 200 of the present invention), if the fixed reflection plate 300 is connected to a middle end of the measurement pipe 100, the fixed reflection plate 300 itself may not have sufficient strength to be fixed.

The measurement pipe 100 to which the fixed reflection plate 300 is connected in the first embodiment as described above and the supporting member 310 in the second embodiment may be located at the center of the fuel tank. This is because the center portion of the fuel tank is most deformed when the fuel tank 20 is thermally deformed, and it is necessary to reflect the error of the most deformed portion in the measurement of the residual amount of the fuel.

According to the apparatus for measuring the residual amount of the fuel in the fuel tank using the ultrasonic sensor according to various embodiments as described above, since the measurement sensor that measures the level of the fuel accommodated in the fuel tank and the reference sensor serving as the reference of the measurement sensor are located at the upper portion of the fuel tank, the wirings may be formed at the upper portion of the fuel tank, the wirings may be simplified, and the assembly method of the fuel tank may be simplified.

In addition, according to the present invention, since the calculating unit determines whether the fuel tank has expanded or contracted through the height of the fixed reflection plate measured by the reference sensor and reflects the determination result in the calculation of the residual amount of fuel accommodated in the fuel tank, the residual amount of the fuel may be more accurately calculated.

The present invention is not limited to the above-mentioned embodiments, and may be variously applied, and may be variously modified without departing from the gist of the present invention claimed in the claims.

The invention claimed is:

1. An apparatus for measuring a residual amount of fuel in a fuel tank using an ultrasonic sensor, the apparatus comprising: a measurement pipe installed in the fuel tank so that the fuel is introduced into an internal space of the measurement pipe; a measurement sensor installed on an inner upper surface of the fuel tank to emit ultrasonic waves toward a liquid level of fuel accommodated in the internal space of the measurement pipe and to measure the time that the ultrasonic waves are reflected from the liquid level and returned; a fixed reflection plate installed above fuel accommodated in the fuel tank and having a fixed height to a lower surface of the fuel tank; a reference sensor installed above the fuel accommodated in the fuel tank to emit the ultrasonic waves toward the fixed reflection plate and to measure the time that the ultrasonic waves are reflected from the fixed reflection plate and returned; and a calculation unit calculating the residual amount of the fuel tank using the time measured by the measurement sensor, the time measured by the reference sensor, a height of the fixed reflection plate, and an area of a cross section of the fuel tank.

2. The apparatus of claim 1, wherein the fixed reflection plate is coupled to a member extending upwardly from the lower surface of the fuel tank, or is coupled to the measurement pipe.

3. The apparatus of claim 2, wherein the fuel tank is formed of a synthetic resin, and the member or the measurement pipe is formed of a material having a thermal expansion coefficient smaller than that of the synthetic resin forming the fuel tank.

4. The apparatus of claim 1, wherein the fixed reflection plate and the measurement pipe are located at the center of cross section of the fuel tank.

5. The apparatus of claim 1, wherein the calculation unit calculates an interval between the reference sensor and the fixed reflection plate by using the time measured by the reference sensor, and calculates the degree of expansion or contraction of the fuel tank by comparing the interval with a reference interval between the reference sensor and the fixed reflection plate when the fuel tank does not expand or contract.

6. The apparatus of claim 5, wherein the calculation unit calculates the residual amount of the fuel tank using the calculated degree of expansion or contraction of the fuel tank, a speed of the ultrasonic wave calculated by the time measured by the reference sensor, the height of the liquid level calculated by the time measured by the measurement sensor, and the area of the cross section of the fuel tank.

\* \* \* \* \*